United States Patent
Wakisaka et al.

(10) Patent No.: US 6,729,148 B2
(45) Date of Patent: May 4, 2004

(54) REFRIGERATING CYCLE DEVICE FOR VEHICLE AND CONTROLLING METHOD THEREOF

(75) Inventors: Takeshi Wakisaka, Ichinomiya (JP); Kazuhito Miyagawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/409,251

(22) Filed: Apr. 8, 2003

(65) Prior Publication Data

US 2003/0196442 A1 Oct. 23, 2003

(30) Foreign Application Priority Data

Apr. 19, 2002 (JP) ........................................ 2002-117456

(51) Int. Cl.[7] .................................................. F25B 5/00
(52) U.S. Cl. ........................................ 62/133; 62/228.5
(58) Field of Search ................................ 62/133, 228.1, 62/228.5, 228.4, 230, 243, 239, 323.1, 323.4, 323.3; 123/198 R, 339.17

(56) References Cited

U.S. PATENT DOCUMENTS

| | | | | |
|---|---|---|---|---|
| 4,510,764 A | * | 4/1985 | Suzuki | ........................ 62/243 |
| 4,606,197 A | * | 8/1986 | Takahashi et al. | ......... 62/228.5 |
| 4,862,700 A | * | 9/1989 | Suzuki | ........................ 62/133 |
| 5,893,272 A | * | 4/1999 | Hanselmann et al. | ...... 62/228.5 |
| 6,481,225 B2 | * | 11/2002 | Kimura et al. | ................ 62/133 |

FOREIGN PATENT DOCUMENTS

| | | |
|---|---|---|
| JP | 8-164840 | 6/1996 |
| JP | 2000-073810 | 3/2000 |

* cited by examiner

*Primary Examiner*—Harry B. Tanner
(74) *Attorney, Agent, or Firm*—Harness, Dickey & Pierce, PLC (57) ABSTRACT

A vehicle refrigerating cycle device capable of preventing the air-conditioning from becoming inadequate and capable of improving vehicle fuel economy is installed in a vehicle having both, a vehicle engine capable of carrying out stratified combustion and a brake booster. Negative pressure generated in an intake system of the engine is accumulated as brake negative pressure, which drives the brake booster. The refrigerating cycle device has a variable displacement type compressor driven by the vehicle engine and a negative pressure detection means for detecting the brake negative pressure. In the stratified combustion operation and at the time of the brake operation to cause the vehicle to stop, the volume in the compressor is controlled to reduce the load on the compressor by a prescribed amount when the detected brake negative pressure is below a prescribed value. Then, the volume in the compressor is gradually increased.

7 Claims, 5 Drawing Sheets

FIG. 4A
ACCELERATOR OPENING

TIME t

FIG. 4B
VEHICLE SPEED

TIME t

FIG. 4C
STOP LAMP

TIME t

FIG. 4D
CONTROL RANGE DETERMINATION

TIME t

FIG. 4E
COMBUSTION MODE

TIME t

FIG. 4F
BRAKE NEGATIVE PRESSURE

TIME t

FIG. 4G
COMPRESSOR OPERATION TORQUE

TIME t

FIG. 4H
BLOWING TEMPERATURE

TIME t

REFRIGERATING CYCLE DEVICE FOR VEHICLE AND CONTROLLING METHOD THEREOF

CROSS REFERENCE TO RELATED APPLICATION

This application is based upon, claims the benefit of priority of, and incorporates by reference, the contents of Japanese Patent Application No. 2002-117456 filed Apr. 19, 2002.

BACKGROUND OF THE INVENTION

1. Field of the Invention

The present invention relates to a refrigerating cycle device for a vehicle and a controlling method thereof.

2. Description of the Related Art

A conventional refrigerating cycle device for a vehicle as disclosed by Japanese Patent Laid-Open Publication No. 2000-73810 is known. The refrigerating cycle device for a vehicle is installed in a vehicle having an engine capable of switching combustion methods between stratified combustion and homogeneous combustion. Additionally, the vehicle has a brake booster that is driven by negative pressure generated in an intake system and accumulated as brake negative pressure.

When the accumulated brake negative pressure is not large enough to activate the brake booster during stratified combustion operation of the engine, the intake air quantity of the engine is reduced, and the refrigerating cycle device for the vehicle is prevented from being driven. When the outdoor air temperature is high, the combustion method is switched from stratified combustion to homogeneous combustion, so that the air-conditioning can be continued without stopping the driving of the refrigerating cycle device of the vehicle.

In this way, the refrigerating cycle device of the vehicle is stopped during the stratified combustion operation in order to reduce the load on the vehicle engine and thus reduce the intake air quantity. This causes the throttle valve to move to the closing side, and the brake negative pressure necessary for driving the brake booster can be secured while the stratified combustion operation is continued.

When the refrigerating cycle device for a vehicle should not be stopped the vehicle engine switches the combustion method from stratified combustion to homogeneous combustion. This reduces the intake air quantity and thus secures the brake negative pressure necessary for driving the brake booster.

However, since the refrigerating cycle device for a vehicle is thus stopped in order to secure the necessary brake negative pressure, the air-conditioning capability could fall short. In addition, the switching between stratified combustion and homogeneous combustion could result in poor fuel economy.

SUMMARY OF THE INVENTION

The present invention is directed to a solution to the above-described problems. It is thus an object of the present invention to provide a refrigerating cycle device for a vehicle that is capable of preventing the air-conditioning capability from falling short while improving vehicle fuel economy, and a method of controlling such a device.

In order to achieve the above-described object, the following technical means is employed. A refrigerating cycle device for a vehicle according to a first aspect of the present invention is installed in a vehicle having a vehicle engine (11) capable of carrying out stratified combustion and a brake booster (11a). Negative pressure generated in an intake system of the engine (11) is accumulated as brake negative pressure (Pb). The brake booster is driven by the brake negative pressure (Pb).

The refrigerating cycle device has a variable displacement type compressor (2) that uses the vehicle engine (11) as a driving source and a control means (14) for controlling the operation of the compressor (2). Negative pressure detection means (19a) for detecting the brake negative pressure (Pb) is provided. In the stratified combustion operation and at the time of brake operation to cause the vehicle to stop, the control means (14) controls the volume in the compressor (2) so that the load on the compressor (2) is reduced by a prescribed amount when the brake negative pressure (Pb) detected by the negative pressure detection means (19a) is below a prescribed value (B1), and then the volume in the compressor (2) is controlled so that it gradually increases.

In this way, the load on the vehicle engine (11) is reduced for the reduced load on the compressor (2), and the intake air quantity is reduced. More specifically, the throttle valve (11b) is set to the closing side, so that the brake pressure (Pb) is secured to continue the stratified combustion operation. Then, the volume in the compressor (2) gradually increases, and the air-conditioning capability can be prevented from being inadequate.

According to a second aspect of the invention, the prescribed load amount (A) to be reduced from the load on the compressor (2) is determined based on the degree of how much lower the brake negative pressure (Pb) is than the prescribed value (B1). In this way, the stratified combustion operation can be continued, while the effect on the air-conditioning capability can be minimized.

According to a third aspect of the invention, the load on the compressor (2) is controlled as the operation torque, so that the brake negative pressure (Pb) can be secured in direct association with the combustion method of the engine (11). The operation torque of the compressor (2) can easily be controlled using detection signals for the discharge volume, the discharge pressure, the engine revolution number, and the like used for normal control of the refrigerating cycle device (1).

The fourth to sixth aspects of the invention are related to a method of controlling a refrigerating cycle device for a vehicle and its technical significance is essentially the same as the refrigerating cycle device for a vehicle according to the first to third aspects.

Note that the reference characters in the parentheses indicate the correspondence between these elements and the elements in the following description of embodiments.

DETAILED DESCRIPTION OF THE PREFERRED EMBODIMENTS

[First Embodiment]

Figure 1:
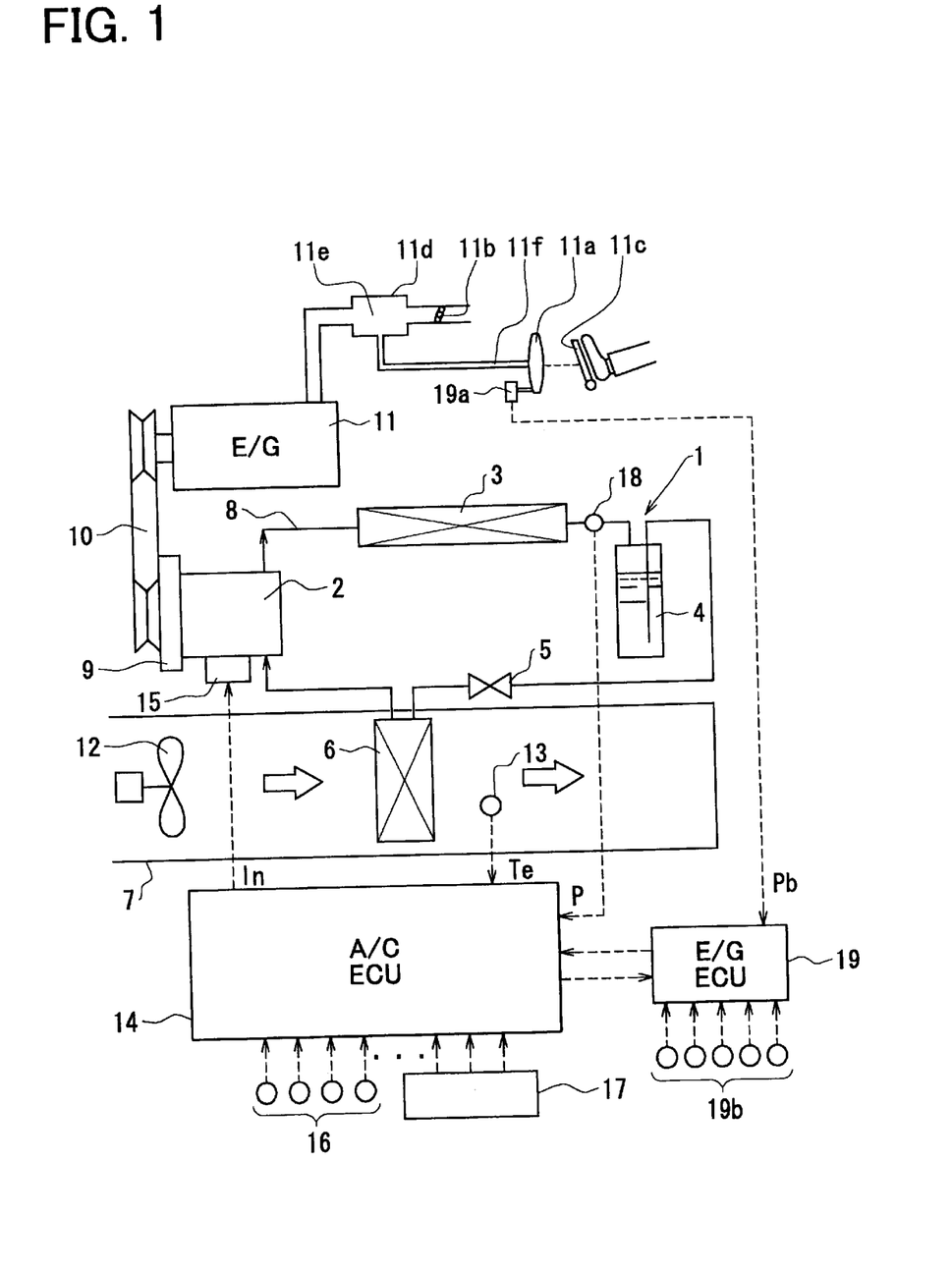
FIG. 1 is a diagram showing the general structure of a system including a refrigerating cycle device for a vehicle according to the present invention.

A first embodiment of the invention will be described with reference to FIGS. 1 to 4. FIG. 1 is a diagram showing the general structure of a system including a refrigerating cycle device for a vehicle 1 according to the embodiments. A vehicle in which the refrigerating cycle device 1 is installed has a vehicle engine E/G 11, hereinafter simply referred to as an "engine." The engine 11 is capable of switching the combustion method between homogeneous combustion and stratified combustion.

In homogeneous combustion, a homogenous air-fuel mixture, that is, when fuel is homogeneously mixed in air, is combusted when a high revolution load requiring high power is requested, so that sufficient engine power is obtained. In the stratified combustion operation, when a lot of power is not requested, as in the case of a low revolution load, the fuel density around the ignition plug is increased in order to improve the ignition performance, so that the average air/fuel ratio of the air-fuel mixture is higher than a theoretical air/fuel ratio. In this way, fuel economy can be improved. In the stratified combustion operation, a throttle valve 11b is controlled more to the open side as compared to the case of the homogeneous combustion operation.

As well known, the vehicle is provided with a brake booster 11a for reducing the force required when the brake pedal 11c is depressed. The brake booster 11a is connected with a negative pressure path 11f extended from an intake path 11e downstream of the throttle valve 11b provided in an intake pipe 11d in the engine 11. Air is taken in through the negative pressure path 11f from inside the brake booster 11a by the negative pressure in the intake path 11e. The brake booster 11a is driven by the brake negative pressure Pb generated in the brake booster 11a by the suction of air. Note that the brake negative pressure Pb is accumulated by the function of a check valve (not shown) provided in the brake booster 11a. The brake negative pressure Pb is detected by a booster pressure sensor 19a provided in the brake booster 11a.

The refrigerating cycle device 1 for vehicle air conditioning includes a compressor 2 that takes in, compresses, and discharges refrigerant. A high temperature, high pressure, overheated refrigerant gas discharged from the compressor 2 moves into a condenser 3 and is subjected to heat exchange with outside air blown from a cooling fan (not shown). In this way, the refrigerant is cooled and condensed.

The refrigerant condensed by the condenser 3 then moves into a receiver (gas-liquid separator) 4 and is separated into a gas and a liquid in the receiver 4. The excess liquid refrigerant in the refrigerating cycle device 1 is stored in the receiver 4. The liquid refrigerant from the receiver 4 has its pressure reduced by an expansion valve (decompression means) 5, and attains a gas-liquid phase. The low pressure refrigerant from the expansion valve 5 comes into an evaporator 6. The evaporator 6 is provided in an air conditioning case 7 that forms an air passage for the vehicle air-conditioning device. The low pressure refrigerant introduced in the evaporator 6 absorbs heat from air blown by a blower 12 and cools the air as the refrigerant evaporates. The parts between these cycle components 2 to 6 are connected by the refrigerant pipe 8 to form a closed circuit.

The compressor 2 is driven by the engine 11 through a power transmission mechanism 9, a belt 10 and the like. The compressor 2 is a variable displacement compressor as will be described. According to the embodiment, the power transmission mechanism 9 is a clutch mechanism (such as an electromagnetic clutch) that can be selectively operated to transmit or stop power in response to external power control. This mechanism may be a constant power transmission type clutch-less mechanism.

An air conditioning controller (A/C ECU) 14 is a control means that controls the operation of the compressor 2, the blower 12, and other operation portions (not shown) for air conditioning. Detection signals from a sensor group 16 for automatic air conditioning control and operation signals from an operation switch group on an air-conditioning panel 17 are input to the controller. Note that the sensor group 16 includes an inside air sensor, an outside air sensor, a solar radiation sensor, an engine water temperature sensor, and the like. The operation switch group on the air conditioning operation panel 17 includes a temperature setting switch, an air quantity selector switch, a blowing mode selector switch, an inside/outside air selector switch, and an air-conditioning switch that outputs an operation instruction to the compressor 2.

An evaporator blowing temperature sensor 13 made of a thermistor that detects the temperature of the blown air right after-the air passes the evaporator 6 is positioned immediately following the evaporator 6 on the downstream side in the air conditioning case 7. A detection signal Te by the sensor 13 is input to the air conditioning controller 14.

In the refrigerating cycle device 1, a high pressure sensor 18 that detects high pressure (the discharge pressure of the compressor) is provided at the high pressure circuit portion positioned between the discharge side of the compressor 2 and the inlet of the expansion valve 5. A detection signal P from the high pressure sensor 18 is also input to the air conditioning controller 14. Herein, the high pressure sensor 18 is provided at the refrigerant pipe at the outlet side of the condenser 3.

The air conditioning controller 14 is connected with the engine controller (E/G ECU) 19 on the vehicle side, so that signals can be input and output between the controllers 14 and 19. As is well known, the engine controller 19 generally controls the quantity of fuel injection into the engine 11, the ignition timing and the like in response to signals from a sensor group 19b that detects the operational state of the engine 11.

According to the embodiment, the engine controller 19 transmits to the air conditioning controller 14 various kinds of information including information on the engine revolution number (rpm), the vehicle speed, the throttle opening, or accelerator opening, the operation state of the brake (stop lamp) detected by the sensor group 19b, and information on the brake negative pressure Pb detected by the booster pressure sensor 19a of the brake booster 11a. The transmitted information is used for determining the brake negative pressure and calculating the compressor load (operation torque) and the like. Note that the booster pressure sensor 19a corresponds to the negative pressure detection means according to the invention.

Figure 2:
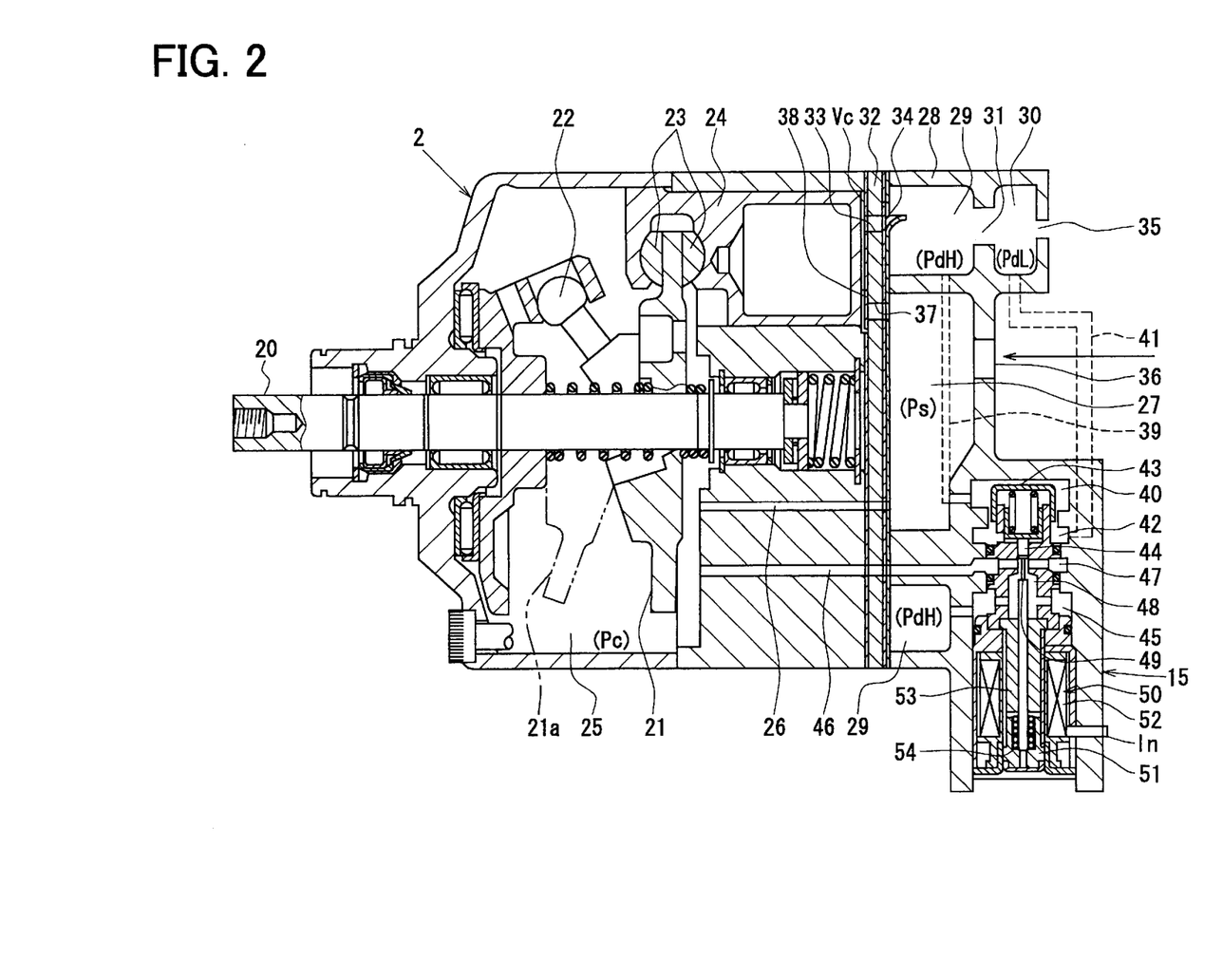
FIG. 2 is a cross-sectional view of the compressor in FIG. 1.

FIG. 2 is a cross-sectional view of a compressor 2 used according to the embodiment. The compressor 2 is an externally controlled, variable displacement compressor having its discharge volume controlled by the air conditioning controller 14. More specifically, a target flow rate Gro for the discharge flow rate of the compressor is set based on a control current (control current signal) In from the electromagnetic volume control valve 15, and the discharge volume is increased and reduced so that the discharge flow rate of the compressor is maintained at the target flow rate Gro (the discharge volume control method). More specifically, the target flow rate Gro increases proportionately as the control current In increases.

The compressor 2 is a single swash plate, variable displacement type compressor. The power of the engine 11 is transmitted to the rotation shaft 20 through the power transmission mechanism 9 and the like in FIG. 1. The left end of the rotation shaft 20 in FIG. 2 serves as a coupling portion with the power transmission mechanism 9. The swash plate 21 is integrally and rotatably connected to the rotation shaft 20, and the inclination angle of the swash plate 21 can be adjusted by a spherical hinge mechanism 22.

A plurality of (five for example) pistons 24 are coupled to the swash plate 21 through a shoe 23. Therefore, when the swash plate 21 is integrally rotated with the rotation shaft 20, the plurality of pistons 24 are sequentially reciprocated through the shoe 23 to increase or reduce the volume of the cylinder chamber (operation chamber) Vc, so that the refrigerant is drawn in for compression.

In order to change the discharge volume of the compressor 2, the pressure Pc in the crank chamber (swash plate chamber) 25 that stores the swash plate 21 is changed, so that the inclination angle of the swash plate 21 is changed to change the stroke of the pistons 24. More specifically, when the inclination angle of the swash plate 21 increases (as denoted by the double-dotted line 21a in FIG. 2), the piston stroke increases, and the discharge volume is increased accordingly. Meanwhile, when the inclination angle of the swash plate 21 is reduced (as denoted by the solid line 21 in FIG. 2), the piston stroke is reduced, and the discharge volume is reduced accordingly.

Therefore, the crank chamber 25 also serves as a control pressure chamber for changing the discharge volume of the compressor 2. Note that the crank chamber (swash plate chamber) 25 is in communication with the intake chamber 27 of the compressor 2 through a restriction path 26.

Meanwhile, in the rear housing 28 of the compressor 2, first and second discharge chambers 29 and 30 are formed. The first discharge chamber 29 is in communication with the second discharge chamber 30 through a restriction communication path (restriction portion) 31 having a restricting hole of a prescribed diameter. The refrigerant discharged from the cylinder chamber Vc of each piston 24 is allowed to enter into the first discharge chamber 29 through the discharge port 33 and the discharge valve 34 of the valve plate 32, gather, and have its discharge pulsation smoothed. The second discharge chamber 30 is connected to an external refrigerant discharge pipe through the discharge outlet 35.

The rear housing 28 is also provided with an intake 36 to take in a low pressure refrigerant gas from the outlet of the evaporator 6, and an intake chamber 27 into which the refrigerant comes from the intake 36. The refrigerant is taken into the cylinder chamber Vc from inside the intake chamber 27 through the intake port 37 and the intake valve 38 of the valve plate 32.

When the refrigerant is passed from the first discharge chamber 29 to the second discharge chamber 30 through the restriction communication path 31, there is a loss of pressure, and the pressure PdL in the second discharge chamber 30 is lower than the pressure PdH in the first discharge chamber 29 by a prescribed value ΔP. The differential pressure ΔP between the pressure before and after the restriction communication path 31 corresponds to the flow rate of the refrigerant discharged from the compressor.

The electromagnetic volume control valve (hereinafter simply as "control valve") 15 forms a discharge volume control mechanism that controls the pressure Pc in the crank chamber 25 forming a control chamber. The electromagnetic volume control valve 15 is formed at the side of the rear housing 28 of the compressor 2. More specifically, the control valve 15 is provided with a first control chamber 40 to which the pressure PdH in the first discharge chamber 29 is applied through a communication path 39, and a second control chamber 42 to which pressure PdL in the second discharge chamber 30 is applied through a communication path 41. The control chambers 40 and 42 are separated by a slidable cylindrical member 43. In this way, the force caused by the differential pressure ΔP between the control chambers 40 and 42 acts upon one end of a push rod 44 through the cylindrical member 43 or the like as a force acting in the direction to open the valve.

The control valve 15 is provided with a discharge pressure chamber 45 to which the pressure PdH in the first discharge chamber 29 is applied and a control pressure chamber 47 that is in communication with the crank chamber 25 through a communication path 46. The discharge pressure chamber 45 and the control pressure chamber 47 are communicated through a restriction path 48, and the cross-sectional area of the opening of the restriction path 48 is adjusted by the valve element 49 of the push rod 44, so that the pressure in the control pressure chamber 47, in other words, the pressure in the crank chamber 25 (control pressure) Pc can be adjusted.

Continuing, the electromagnetic mechanism portion 50 of the control valve 15 acts as a force against the valve opening force of the differential pressure ΔP, in the other words, as a valve closing force upon the valve element 49 (push rod 44). The valve element 49 is integrally coupled to the plunger (moving core) 51 of the electromagnetic mechanism portion 50, and the electromagnetic attraction induced by the excitation coil 52 acts upon the plunger 51. More specifically, the plunger 51 is provided to oppose the fixed pole member (fixed core) 53 at a prescribed distance, and the plunger 51 is displaced axially toward the fixed pole member 53 (upward in FIG. 2) by the electromagnetic attraction induced by the excitation coil 52. The axial displacement of the plunger 51 moves the valve element 49 in the direction to close the valve. A coil spring 54 is provided between the plunger 51 and the fixed pole member 53 as an elastic member to exert an elastic force against the electromagnetic force.

According to the embodiment, the control current (control current signal) In passed through the excitation coil 52 is controlled, for example, by controlling the interruption ratio of the control current In, in other words, by controlling the duty ratio Dt, so that the desired electromagnetic attraction force (i.e., the force acting in the direction to close the valve element 49) acts upon the plunger 51. The control current In of the excitation coil 52 is controlled by the above-described air conditioning controller 14.

The control valve 15 has the above-described structure, and the force to close the valve of the valve element 49 is increased by controlling the control current In. In this way, the valve element 49 is displaced upwardly in FIG. 2 to reduce the cross-sectional area of the opening of the restriction path 48, therefore the pressure in the control pressure chamber 47, in other words, the pressure Pc in the crank chamber 25 is lowered, and the inclination angle of the swash plate 21 increases as denoted by the double-dotted line 21a in FIG. 2. This increases the discharge volume.

Conversely, when the force to close the valve element 49 is reduced by controlling the control current In, the valve element 49 is displaced downwardly in FIG. 2 by the force of the coil spring 54 to increase the cross-sectional area of the opening of the restriction path 48 so that the pressure in the control pressure chamber 47, in other words, the pressure Pc in the crank chamber 25, increases and the inclination angle of the swash plate 21 is reduced as denoted by the solid line in FIG. 2. This reduces the discharge volume.

Meanwhile, when the number of revolutions (rpms) of the engine 11 increases to raise the number of revolutions of the compressor 2, the flow rate of the refrigerant discharged from the compressor 2 increases accordingly. However, as the flow rate of the discharged refrigerant increases, the differential pressure $\Delta P$ between the first and second control chambers 40, 42 increases, which increases the force to open the valve. Then, the push rod 44 and the valve element 49 move downwardly in FIG. 2 and the cross-sectional area of the opening of the restriction path 48 increases. This increases the pressure Pc in the crank chamber 25 and the discharge volume of the compressor 2 decreases.

Conversely, when the number of revolutions of the engine 11 decreases, the number of revolutions of the compressor 2 is reduced. However, as the flow rate of the refrigerant discharged from the compressor 2 decreases accordingly, the differential pressure $\Delta P$ between the first and second control chambers 40, 42 decreases, so that the push rod 44 and the valve element 49 move upwardly in FIG. 2 and the cross-sectional area of the opening of the restriction path 48 decreases. This lowers the pressure Pc in the crank chamber 25 and the discharge volume of the compressor 2 increases.

At the time, the push rod 44 and the valve element 49 move to the position where the valve closing force and valve opening force are balanced, this means that the discharge volume of the compressor 2 mechanically changes until the differential pressure $\Delta P$ between the first and second control chambers 40, 42 reaches the prescribed differential pressure, i.e., the target differential pressure $\Delta Po$ that is uniquely determined by the valve closing force (electromagnetic attraction) as described above. Therefore, the control current In is changed to change the target differential pressure $\Delta Po$ uniquely determined by the valve closing force (electromagnetic attraction), so that the discharge volume can be changed and the flow rate of the refrigerant to be actually discharged from the compressor 2 can be changed.

Figure 3:
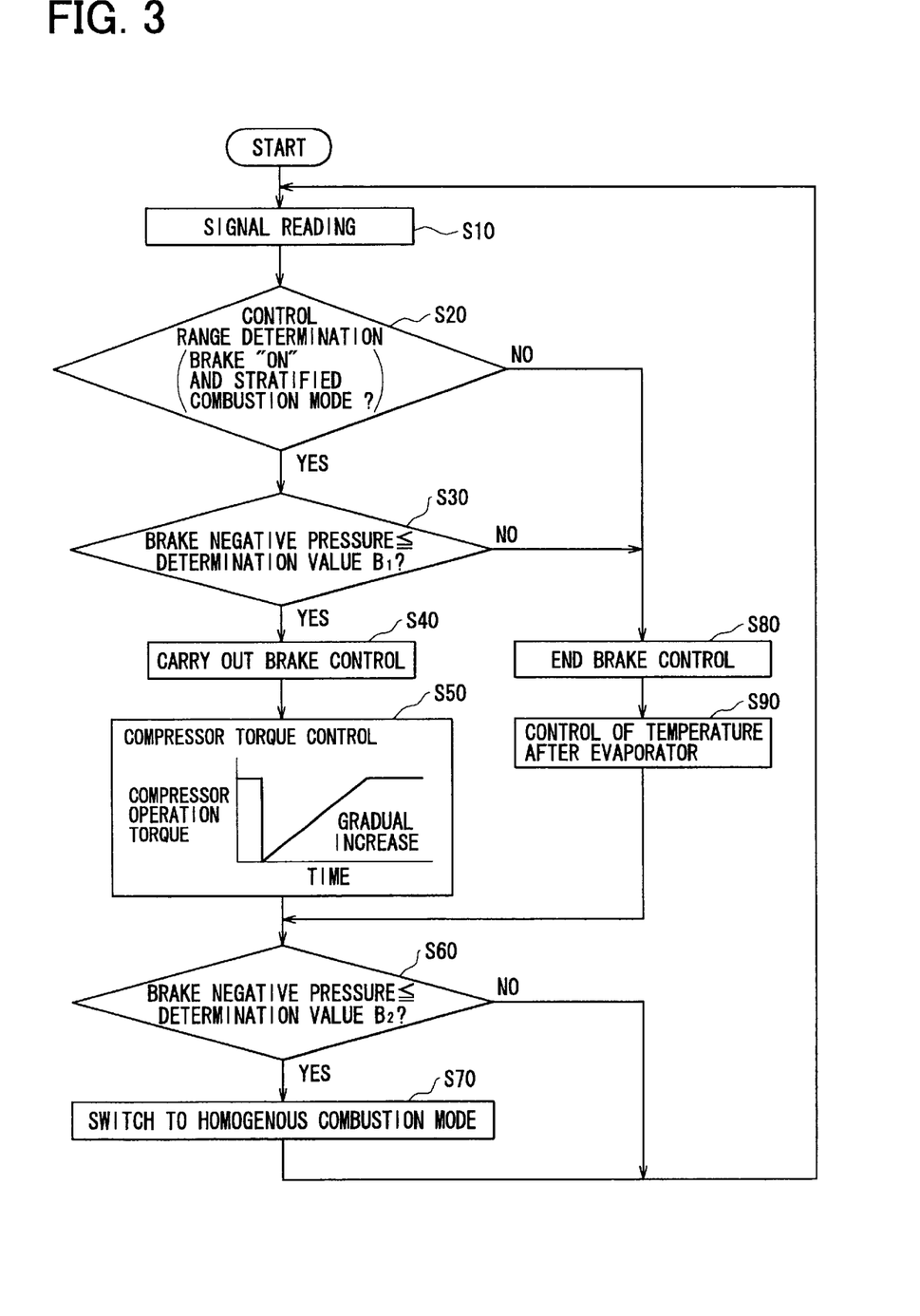
FIG. 3 is a flow chart for use in illustrating how a compressor is controlled according to a first embodiment of the invention.

Now, how to control the load on the compressor in response to the brake negative pressure will be described with reference to FIGS. 3 and 4. Note that in the following description of the embodiment, the load on the compressor is described as operation torque T. FIG. 3 is a flowchart for use in illustrating control carried out in the air conditioning controller 14 in connection with the control of the load (operation torque T) of the compressor. At the beginning of the control flowchart, the engine 11 is activated, and the air conditioner switch in the air conditioning operation panel 17 is on. In other words, the compressor 2 is in an ON state. FIG. 4 is a timing chart showing the operation states of the elements.

Figure 4A:
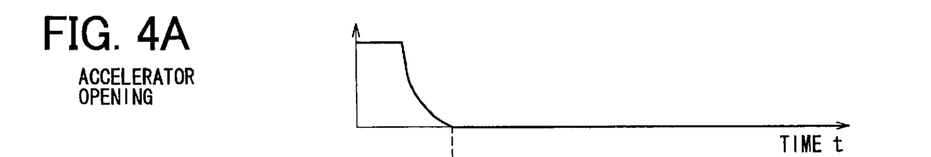
FIG. 4A is a graph illustrating accelerator opening versus time in controlling the compressor.
Figure 4B:
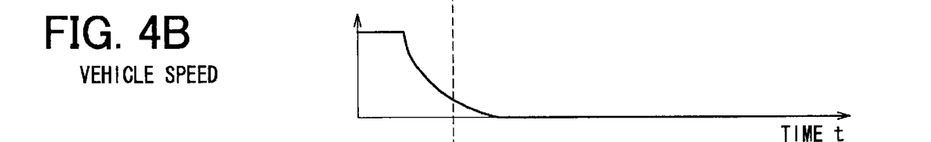
FIG. 4B is a graph illustrating vehicle speed versus time in controlling the compressor.
Figure 4C:
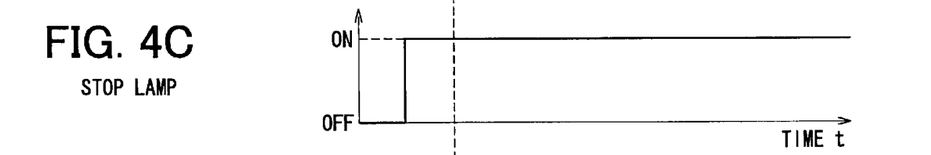
FIG. 4C is a graph illustrating the operation states of a stop lamp (brake) versus time in controlling the compressor.
Figure 4D:
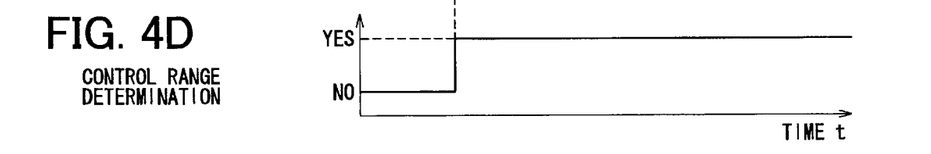
FIG. 4D is a graph illustrating the determination state of the control range versus time in controlling the compressor.
Figure 4E:
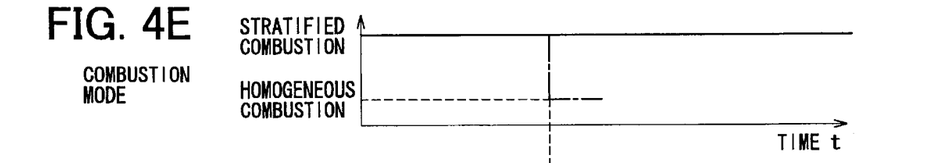
FIG. 4E is a graph illustrating the combustion mode versus time in controlling the compressor.

In step S10, various signals from the sensor group 16, the air conditioning operation panel 17, and the engine controller 19 are read. In step S20, it is determined whether the compressor 2 has entered the operation control range according to the invention. In other words, when the engine 11 carries out stratified combustion mode operation, the brake is operated (which turns on the stop lamp) to cause the vehicle to stop, and when the accelerator opening is zero (FIGS. 4A to 4C), it is determined that the control range is entered (FIG. 4D).

When it is determined in step S20 that the control range is entered, it is determined in step S30 whether or not the brake negative pressure Pb of the brake booster 11a is smaller than a prescribed determination value (prescribed value) B1, and if the result of the determination is affirmative, an instruction to carry out brake control is output in step S40. Note that the brake negative pressure Pb is considered in terms of its absolute value, and when the brake negative pressure Pb is smaller, it means that the pressure is closer to the atmospheric pressure. The above determination value B1 is set as a value larger than the determination value B2. At the value B2, the brake negative pressure Pb is reduced as denoted by the chain-dotted line in FIG. 4F, and the combustion method for the engine 11 should be switched from stratified combustion to homogenous combustion as denoted by the chain-dotted line in FIG. 4E.

Figure 4F:
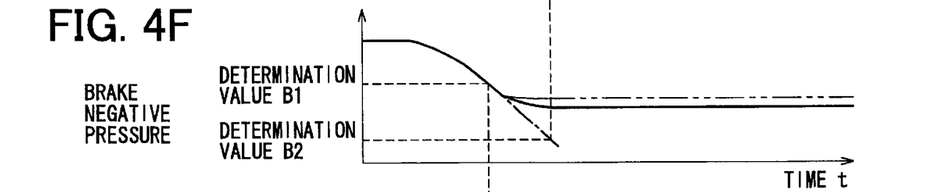
FIG. 4F is a graph illustrating the brake negative pressure versus time in controlling the compressor.
Figure 4G:
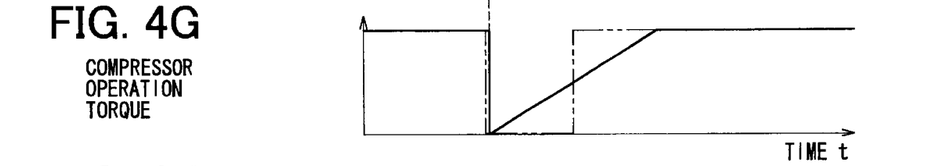
FIG. 4G is a graph illustrating the operation torque of the compressor versus time in controlling the compressor.

In step S50, the operation load on the compressor 2, in other words, the operation torque T is set to be variable. The value of the operation torque T for the operation up to a point is reduced by a prescribed value. Here, the value is once reset to zero. Then, the control current In is controlled so that the discharge volume of the compressor 2 is gradually regained, so that the value of the operation torque T is gradually increased and returned to the original value (FIG. 4G).

Note that when it is determined in step S60 that after step S50, for some reason, the brake negative pressure Pb is even smaller than the determination value B2, which is smaller than the determination value B1, the combustion method for the engine 11 is switched in step S70 from the stratified combustion to the homogeneous combustion in order to secure the brake negative pressure Pb necessary for vehicle operation. When the result of determination in step S60 is negative, the control returns to the start and the control flow described above is repeated.

Meanwhile, if the determination result is negative in either of steps S20 or S30, the control proceeds to step S80. Then in step S90, normal compressor control based on the detection signal Te from the blowing temperature sensor 13 of the evaporator is carried out, and control proceeds to step S60.

As in the foregoing, when the brake negative pressure Pb is lower than the prescribed determination value B1, the operation torque T of the compressor 2 is reduced by a prescribed amount. (In the above embodiment, the value is once reset to zero.) Therefore, the load on the engine 11 is reduced proportionately with the reduction in the load on the compressor 2, so that the intake air quantity is reduced, and the throttle valve 11b is set to the closing side. In this way, the brake negative pressure Pb can be secured and stratified combustion can be continued. Note that the brake negative pressure Pb supplied to the brake booster 11a can be maintained by the pressure accumulating function of the brake booster 11*a* (FIG. 4F).

Figure 4H:
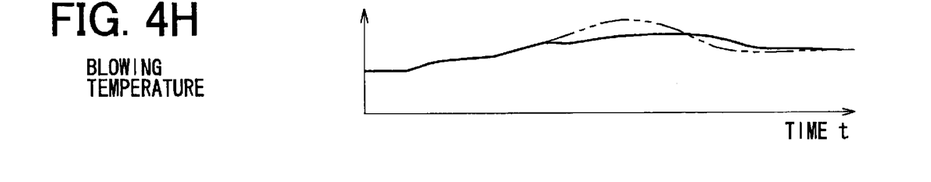
FIG. 4H is a graph illustrating the blowing temperature versus time in controlling the compressor.

The operation torque T is then increased in order to gradually regain the volume of the compressor 2. Therefore, the air-conditioning capability can be prevented from falling short against anything that could stop the refrigerating cycle device 1 as in the conventional case (as denoted by the double-dotted line in FIG. 4G), in other words, against anything that could stop the compressor 2 (FIG. 4H).

Herein, the load on the compressor 2 is controlled as the operation torque T, so that the brake negative pressure Pb can be secured in direct association with the combustion method of the engine 11.

Figure 7:
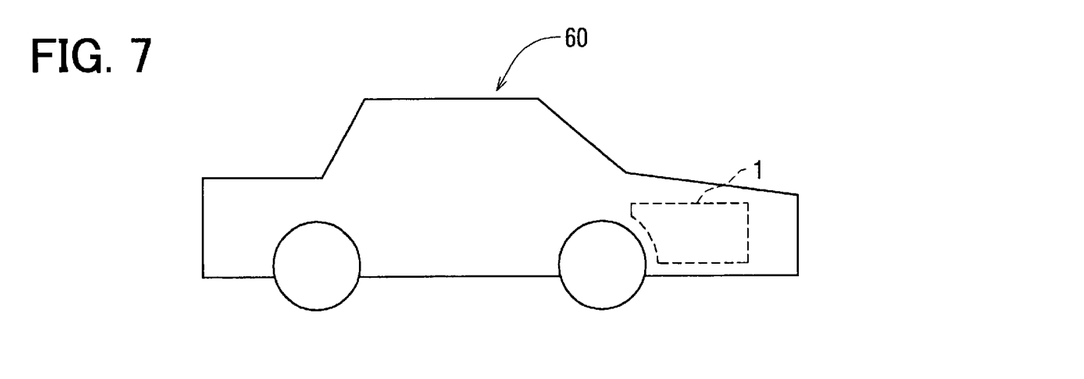
FIG. 7 is a vehicle in which the structure of a system including a refrigerating cycle device of the present invention is typically installed.

FIG. 7 shows a vehicle 60 in which the structures and systems of FIG. 1 including a refrigerating cycle device 1 of the present invention is typically installed.

[Second Embodiment]

Figure 5:
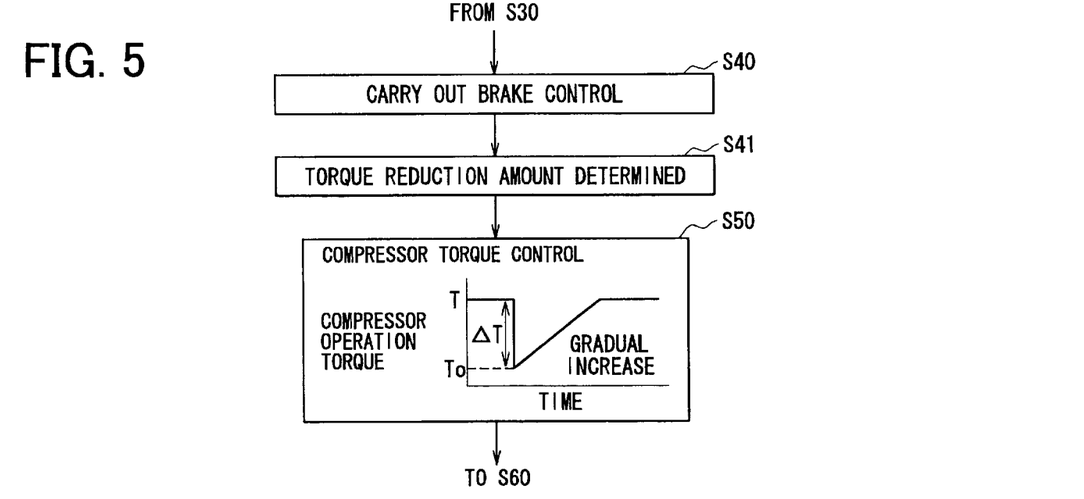
FIG. 5 is a control flow chart for use in illustrating how a compressor is controlled according to a second embodiment of the invention.
Figure 6:
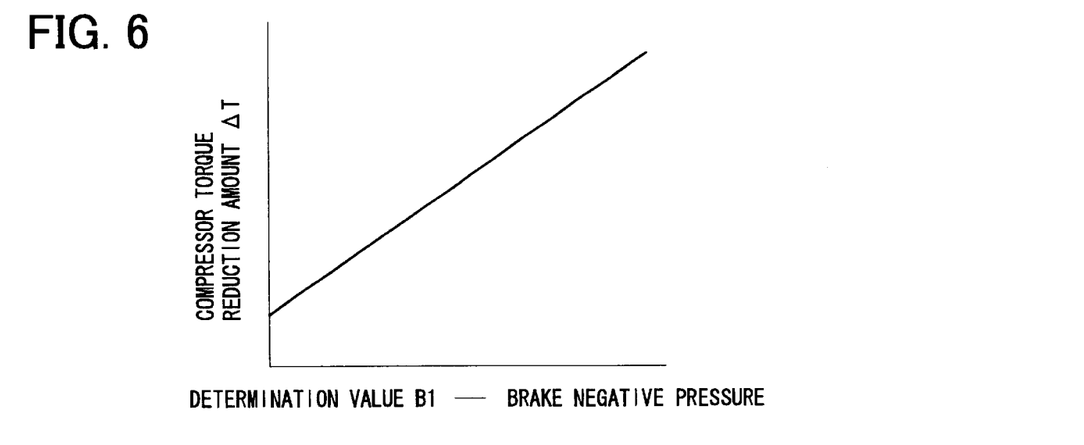
FIG. 6 is a graph showing how a compressor torque reduction amount is determined.

A second embodiment of the invention is shown in FIGS. 5 and 6. As shown in FIG. 5, according to the second embodiment, the step S41 of determining a reduction value for the operation torque T of the compressor 2 depending on the brake negative pressure Pb is added to the control flow of the first embodiment.

Note that the operation torque T of the compressor 2 can be calculated by various methods. According to the embodiment, the operation torque is calculated based on high pressure, that is, the discharge pressure of the compressor, detected by a high pressure sensor 18 and control current In indirectly indicating the discharge volume of the compressor, and the number of revolutions of the engine.

As shown in FIG. 6, in step S41, the torque reduction amount ΔT of the compressor 2 corresponds to the difference between the determination value B1 and the brake negative pressure Pb after it becomes lower than the determination value B1 (for example, after 0.5 seconds). More specifically, the smaller the brake negative pressure Pb is, in other words, the larger the differential negative pressure (differential negative pressure=the determination value B1−the brake negative pressure Pb) is, the larger will be the torque reduction amount ΔT.

In step S50, the torque reduction amount ΔT determined in step S41 is subtracted from the operation torque T of the compressor 2 before the start of control to determine a target compressor torque To. At the time, target control current Ino to control the discharge volume of the compressor 2 is determined by reverse operation using the target compressor torque To, the high pressure (discharge pressure of the compressor) detected by the high pressure sensor 18, and the number of engine revolutions so that the operation torque T of the compressor 2 equals the target compressor torque To.

The discharge volume of the compressor 2 is controlled based on the determined target control current Ino, and the operation torque To, smaller by the torque reduction amount ΔT, is applied. Then, the control current In is restrained in order to prevent the air conditioning capacity from falling short. The discharge volume of the compressor 2 is gradually regained and the value of the operation torque T is increased to the original value.

In this way, the stratified combustion of the engine 11 can be maintained, while the effect on the air conditioning capability can be minimized. The operation torque T of the compressor 2 can easily be controlled using detection signals for the discharge volume, the discharge pressure, the number of engine revolutions, and the like that are used for normal control of the refrigerating cycle device 1.

[Modifications]

According to the first and second embodiments, the operation torque T is increased when the value of the operation torque T of the compressor 2 is reduced by a prescribed amount, but the operation torque To in the reduced level can be maintained for a prescribed period in consideration of securing both the brake negative pressure Pb and the air conditioning capability.

What is claimed is:

1. A vehicle refrigerating cycle device for a vehicle, installed in a vehicle having a vehicle engine capable of carrying out stratified combustion and a brake booster, negative pressure generated in an intake system of the engine being accumulated as brake negative pressure, said brake booster being driven by the brake negative pressure, said refrigerating cycle device comprising:

a variable displacement type compressor driven by said vehicle engine and control means for controlling the operation of said compressor, wherein negative pressure detection means for detecting said brake negative pressure is provided, at the time of the brake operation in said stratified combustion, said control means controls a volume in said compressor so that a load on said compressor is reduced by a prescribed amount when said brake negative pressure detected by said negative pressure detection means is below a prescribed value.

2. The refrigerating cycle device for vehicle according to claim 1, wherein a prescribed load amount to be reduced from the load on said compressor is determined based on a degree of how much lower the brake negative pressure is than said prescribed value.

3. The refrigerating cycle device for vehicle according to claim 2, wherein the load on said compressor is operation torque.

4. The refrigerating cycle device for a vehicle according to claim 1, wherein the control means controls such that a corresponding compressor volume is regained for the volume of said compressor after the brake negative pressure is secured.

5. A method of controlling a vehicle refrigerating cycle device, installed in a vehicle having a vehicle engine capable of carrying out stratified combustion, and a brake booster, negative pressure generated in an intake system of the engine being accumulated as brake negative pressure, said brake booster being driven by the brake negative pressure, said refrigerating cycle device comprising a variable displacement type compressor that uses said vehicle engine as a driving source, the method comprising the steps of:

detecting said brake negative pressure when said stratified combustion operation is carried out and said vehicle is caused to stop by the brake operation;

controlling a volume in said compressor so that a load on said compressor is reduced by a prescribed amount when said detected brake negative pressure is below a prescribed value; and controlling the volume in said compressor so that it is gradually regained.

6. The method of controlling a refrigerating cycle device for a vehicle according to claim 5, wherein a prescribed load amount to be reduced from the load on said compressor is determined based on a degree of how much lower the brake negative pressure is than said prescribed value.

7. The method of controlling a refrigerating cycle device for a vehicle according to claim 6, wherein the load on said compressor is operation torque.

* * * * *